United States Patent [19]

Dechenaux

[11] 3,769,092

[45] Oct. 30, 1973

[54] NON-AQUEOUS ELECTROLYTES

[75] Inventor: Victor Louis Dechenaux, Poitiers, France

[73] Assignee: Societe Des Accumulateurs Fixes Et De Traction (Societe Anonyme), Romain Ville, France

[22] Filed: July 14, 1971

[21] Appl. No.: 162,535

[30] Foreign Application Priority Data
Aug. 7, 1970 France .............................. 7029335

[52] U.S. Cl.............. 136/100 R, 136/155, 136/156
[51] Int. Cl. ........................................... H01m 11/00
[58] Field of Search.................... 136/6, 100 R, 154, 136/155, 156

[56] References Cited
UNITED STATES PATENTS

| 3,544,385 | 12/1970 | Newman | 136/155 |
|---|---|---|---|
| 3,511,716 | 5/1970 | Gabano et al. | 136/155 |

Primary Examiner—Donald L. Walton
Attorney—Kenyon & Kenyon Reilly Carr & Chapin

[57] ABSTRACT

Non-aqueous electrolytes for use in electrochemical cells with a lithium anode and metal sulfide or metal oxide cathode such as copper sulfide or copper oxide. The electrolyte is a purified solvent such as tetrahydrofuran or a purified mixture of tetrahydrofuran and dimethoxyethane with dehydrated lithium perchlorate solute and a stabilizing agent such as triethyl or tributylphosphite.

10 Claims, 2 Drawing Figures

NON-AQUEOUS ELECTROLYTES

BACKGROUND OF INVENTION

This invention relates to non-aqueous electrolytes, more especially intended for use in electric cells with a lithium anode and a metal sulfide or metal oxide cathode, such as a copper sulfide or copper oxide cathode comprising as a solvent tetrahydrofuran or a mixture of tetrahydrofuran and dimethoxyethane and a solute such as lithium perchlorate or other suitable solutes, for example, those disclosed in U. S. Pat. No. 3,542,602 noted directly below together with a non-reacting stabilizing agent for the solvent.

Electrolytes of this general type are disclosed in the U. S. Pat. No. 3,542,602 dated Nov. 24, 1970 assigned to the assignee of the instant application and entitled "Method of preparing non-aqueous electrolytes particularly for primary generators, the electrolytes resulting from said method and primary generators containing the said electrolytes" or in the U.S. Pat. No. 3,511,716 dated May 12, 1970 assigned to the same assignee and entitled "Electrochemical generator utilizing a lithium anode, copper sulfide cathode and non-aqueous electrolytes."

Tetrahydrofuran and dimethoxyethane are known to be easily oxidized, especially when they are exposed to light or in contact with air. For this reason various stabilizing agents are added to these products.

It has been found, however, that in some cases these stabilizing agents react with lithium when the electrolyte is introduced in the cell, such reaction being, of course, undesirable.

On the contrary when such agents are absent, the peroxides which are then formed, promote the decomposition of tetrahydrofuran and above all of dimethoxyethane when the electrolyte added to the cell comes into contact with lithium therein with a resulting evolution of gases mainly made of methane and an increase of the internal resistance of the cell.

Objects and features of the present invention are to remedy these drawbacks.

A primary feature of the invention is to provide a nonaqueous electrolyte, more especially intended for use in electric cells with a lithium anode and a metal sulfide or metal oxide cathode, such as a copper sulfide or copper oxide cathode, comprising as a solvent, a mixture of tetrahydrofuran and dimethoxyethane with lithium perchlorate as solute and characterized in that the electrolyte also comprises a stabilizing agent selected from the alkylphosphites, and preferably triethyl or tributylphosphite.

Such a stabilizing agent it is found is without substantial action upon lithium and, when it is present, the electrolyte can be stored without special precautions.

According to a feature of the invention, the concentration of the said stabilizing agent in the electrolyte is about 0.1 to 1% by weight.

Advantageously, the water content of the electrolyte is at most equal to 0.01% and preferably 0.005% by weight.

Other objects and features of the invention will become apparent from the following detailed description and the accompanying drawings wherein:

FIG. 1 is a graph which shows the variation of internal resistance in ohms of the cells with and without electrolyte embodying the invention during storage, time being measured in days; and FIG. 2 is a graph which shows the variation of the cell thickness in mm. v. time in days of cells with and without electrolyte of this invention illustrating the importance of the effect of gas evolution therein. de

DETAILED DESCRIPTION

As an illustration and without any limitation, an example of the composition of an electrolyte according to the invention is as follows:

% by weight of tetrahydrofuran: about 62%
% by weight of 1–2 dimethoxyethane: about 27%
% by weight of lithium perchlorate: about 11%
% by weight of triethylphosphite or tributylphosphite: about 0.1%
% by weight of water: at most 0.01%
and preferably 0.005%

The electrolyte according to the invention may be prepared by the following method:

As a first step the solvents, e.g., tetrahydrofuran and dimethoxyethane are purified either by distillation or of passage through a molecular sieve.

For example, a molecular sieve with openings of about 4 A. can be used. In this case, the solvents after purification do not contain any stabilizing agent in a substantial amount and their aqueous content becomes lower than 0.0025%.

The preparation of the electrolyte is effected in a glove box under an argon or other inert atmosphere.

In this preparation, lithium perchlorate, previously dehydrated, e.g., by drying in a drying-stove at about 150° C. for about one week is progressively dissolved in the previously purified tetrahydrofuran in the above specified percentages by weight at a temperature maintained at about 25° C.

The previously purified dimethoxyethane and the alkyl phosphite stabilizing agent in the above specified percentage by weight are then added.

The water content of thus prepared electrolyte is generally about 0.005% by weight.

Cells provided with the electrolyte according to the invention which has been added to the cell after having been stored for about one month without any particular precaution concerning light, have been stored for more than 5 months at 45° C. without deterioration.

On the contrary, cells in which the electrolyte did not comprise the triethylphosphite stabilizing agent and which had been stored under the same conditions were found unutilizable after about 1 month or 6 weeks of storage at 45° C.

Figure 1:
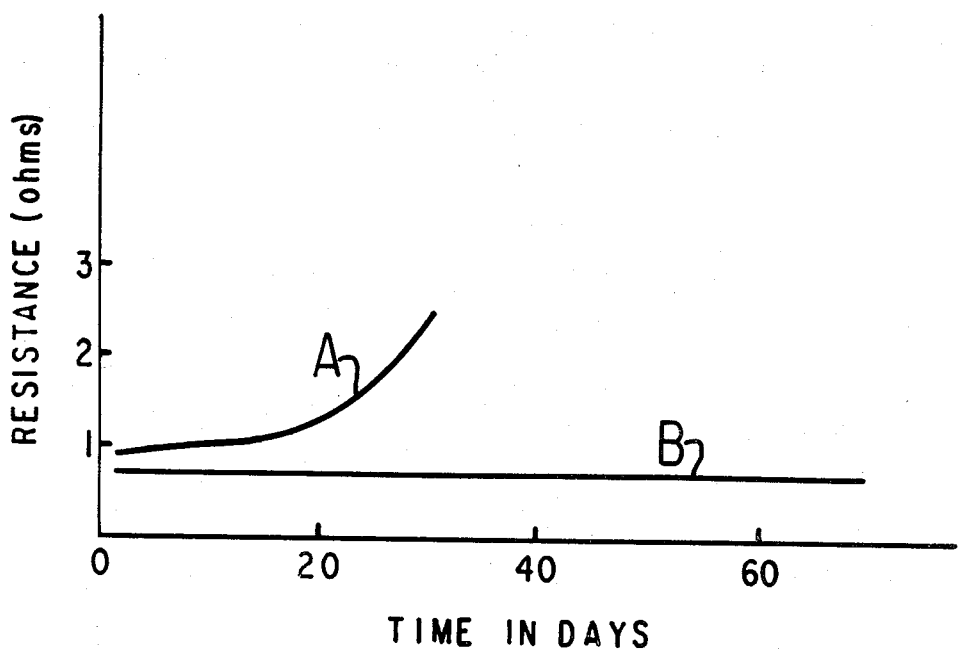

In FIG. 1, the internal resistance R of cells in ohms has been plotted as ordinates against the time T in days as abscissae.

Figure 2:
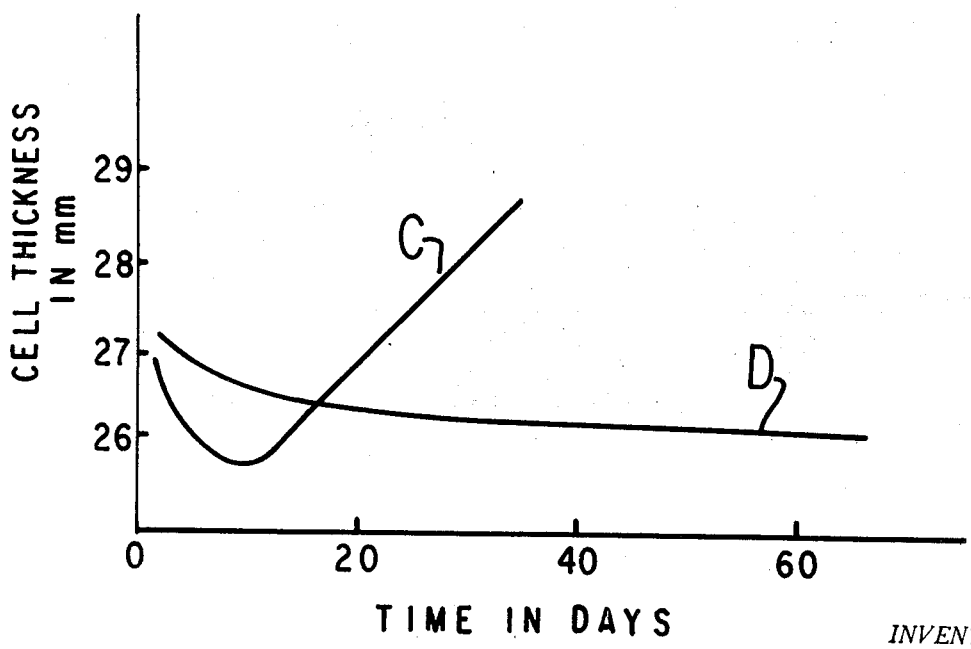

In FIG. 2 the cell thickness e in millimeters has been plotted as ordinates against the time T in days in abscissae.

In FIGS. 1 and 2 curves A and C relate respectively to a cell whose electrolyte free of triethylphosphite stabilizer has been stored for 1 month without special precautions before being added to the cell.

In these FIGS. curves B and D relate respectively to a cell including triethylphosphite stabilizer according to the invention, which has been stored in the same way and then added to the cell.

It can be seen from curves A and C that a cell whose electrolyte does not contain the stabilizing agent according to this invention shows notably great increase of internal resistance and cell thickness occasioned by evolution of gas after storage of from about 1 month to 6 weeks whereas curves B and D of a cell containing the electrolyte with stabilizer of this invention show no material change in internal resistance and even decrease in cell thickness after even 60 days of storage indicating that no gas evolution has occurred. The cell providing curves A and C becomes useless after a short time while the cell with electrolyte embodying the stabilizer or this invention providing curves B and D remains undeteriorated and useful for long periods of time.

It is well understood that the invention is in no way limited to the described details which have been given solely as examples and that variations within the scope of the appended claims are possible and are contemplated. There is no intention of limitation, therefore, to the exact disclosure hereinabove presented.

What is claimed is:

1. A non-aqueous electrolyte for use in electric cells equipped with a lithium anode and a metal sulfide or metal oxide cathode selected from the group consisting of a copper sulfide and copper oxide, consisting of a solvent mixture of tetrahydrofuran and dimethoxyethane with a lithium perchlorate solute and also an alkyl phosphite stabilizing agent selected from the group consisting of triethyl and tributylphosphite.

2. A non-aqueous electrolyte according to claim 1, wherein the concentration of the said stabilizing agent in said electrolyte is about 0.1% to 1% by weight.

3. A non-aqueous electrolyte according to claim 1, having a water content ranging from about 0.005% to 0.01% by weight.

4. An electrolyte according to claim 1 wherein the solvent comprises about 62% by weight of tetrahydrofuran, about 27% by weight of 1–2 dimethoxyethane and the solute is about 11% by weight of lithium perchlorate.

5. A non-aqueous electrolyte for use in an electric cell equipped with a lithium anode and a cathode selected from the group consisting of a metal sulfide and a metal oxide consisting of about 62% by weight of tetrahydrofuran, about 27% by weight of 1–2 dimethoxyethane, about 11% by weight of lithium perchlorate and about 0.1% by weight of a stabilizer agent selected from the group consisting of triethylphosphite and tributylphosphite.

6. An electric cell comprising a lithium anode, a cathode selected from the group consisting of copper sulfide and copper oxide and a non-aqueous electrolyte consisting of about 62% by weight of tetrahydrofuran, about 27% by weight of –2 dimethoxyethane, about 11% by weight of lithium perchlorate and about 0.1% by weight of a stabilizer agent selected from the group consisting of triethylphosphite and tributylphosphite.

7. A method for preparing a non-aqueous electrolyte comprising purifying in a first step tetrahydrofuran and dimethoxyethane, then dissolving dehydrated lithium perchlorate progressively in the tetrahydrofuran at a temperature maintained at about 25° C. and adding purified dimethoxyethane thereto and a stabilizing agent selected from the group consisting of triethylphosphite and tributylphosphite.

8. A method according to claim 7 wherein purification of the tetrahydrofuran and dimethoxyethane is effected by passing them through a molecular sieve with openings of about 4 A.

9. A method accoding to claim 7 wherein purification of the tetrahydrofuran and dimethoxyethane is effected by distillation.

10. A method according to claim 7 wherein dehydration of said lithium perchlorate is effected by drying it for about a week at about 150° C.

* * * * *